April 7, 1964 J. W. SILVA 3,127,836

ABATTOIR DEVICE

Filed April 24, 1962

INVENTOR:
JOSEPH W. SILVA

BY

John D. Wilkins

ATTORNEY 3,127,836
Patented Apr. 7, 1964

3,127,836

ABATTOIR DEVICE

Joseph W. Silva, New Haven, Conn., assignor to Olin Mathieson Chemical Corporation, a corporation of Virginia Filed Apr. 24, 1962, Ser. No. 189,738
4 Claims. (Cl. 102—41)

This invention relates to slaughtering of animals and more particularly to an improved stunning device for cattle, sheep, hogs, and the like.

When animals are butchered for meat purposes, it is necessary they be subjected to "sticking" to cut the jugular vein to allow the blood to bleed out. This throat cutting operation being a dangerous and violent one unless each creature be first stunned, it has been customary before "sticking" to knock each one out by a well-placed sledge hammer blow on the head; this requires lots of skill and is so strenuous and often involves so much damage to the meat and hide in the ensuing panic and struggle, particularly when the blow is off and fails to stun, that more effective and humane methods have been sought and even required by law in various countries. In England and the Scandinavian countries, for example, cattle killing pistols firing bullets or a captive piston have been used to kill or stun as shown in British Patent No. 6491 of 1914, British Patent No. 306,918, U.S. Patent No. 1,569,-153, and Norwegian Patent Nos. 38,280 and 77,301.

Generally, killing and stunning devices powered by gun powder represent an advance in the abattoir art.

Even with these gun powder operated devices, there are disadvantages and dangers since a struggling beast makes a bad target. A pistol held at the head of a 1,500 lb. steer, for example, is likely to slip and a shot fired at an angle to the head bone may ricochet in the slaughter room; occasionally even a squarely fired projectile may emerge unexpectedly from the carcass to the danger of personnel nearby. A slaughtering pistol of the captive piston type likewise has disadvantages of either frequently failing to stun, occasionally breaking down, or of smashing the skull and damaging the brain sufficiently to spoil it as a salable food commodity. Explosive devices which kill or stun by use of a captive piston are often unwieldy affairs mounted on the end of a long and heavy handle; they break frequently when the terror-striken animals jerk their heads away before the piston head has had a chance to strike.

Animal stunning by use of a shooting gallery type of disintegrating bullet has also been tried, but the resulting penetration of particles from the bullet on impact with the target, especially when the bullet includes lead, poses at such close range another hazard, namely, that from embedded pieces and/or poisonous dust within the confinement of the killing chamber of the abattoir. These, like regular bullets, tend to penetrate.

Therefore, one object of this invention is to provide a new and improved explosive actuated device for stunning animals effectively, humanely, safely and with a minimum of damage to the product.

Another object is to provide an explosive cartridge capable of stunning animals without the need for ponderous and unwieldy hammer-like devices depending on impact with the animal.

Another object is to provide a labor saving abattoir device of an economical character avoiding the need for complicated explosive tools subject to frequent breakage necessitating stoppage and the expense of repair.

Still another object is to provide an animal stunning cartridge of small arms caliber characterized by effective stunning without excessive damage and by freedom from the forceful projection of dangerous flying particles upon impact with the animal to be stunned.

Other objects and advantages of the invention will be understood and apparent from the description thereof in this patent specification and the accompanying drawing wherein.

The present invention contemplates a loaded cartridge having in combination a casing, a priming assembly, a charge of propellant and a projectile charge adapted in the particular combination to present a pulverulent missile capable of stunning a beast at a pre-determined distance from the position of the cartridge which is usually at the breech of the barrel of a stunning gun, but incapable of penetration or ricochetting.

The projectile charge is a mass of loose particulate material or a temporarily compacted frangible mass of such material of suitable character. One material found suitable is iron powder preferably of such particle size that not more than about 2% of it is retained on an 80 mesh screen while not more than about 65% is retained on a 325 mesh screen. An iron powder 100% of which passed through an 80 mesh screen while 100% of it was retained on a 100 mesh screen was found effective. Any particle size of iron powder having a diameter not larger than from about 0.05 of an inch to about 0.06 of an inch is contemplated to avoid damaging penetration in the animal. In any event, a variety of sizes of particles within this distribution range is desired for the projectile charge to obtain the greatest weight of powder in the given available volume in the shell case.

It is preferred to use the projectile charge in unagglomerated loose form in an amount such that in combination with the particular explosive propellant charge found suitable at a selected small caliber of cartridge case the projected powdered missile cloud effectively stuns the animals over a predetermined dispersal area at the gun muzzle at a predetermined distance with respect to the muzzle.

Agglomeration of a heavy charge of the powder lightly into the form of a slug such as a cylindrical one allows the slug to break up into discrete particles during the interior ballistics portion of firing whereupon these particles from the compressed iron powder slug proved effective in stunning range cattle which are more difficult to knock down because these animals, some as heavy as 2,100 pounds, have a heavier matting of hair on their heads.

In practice, the lighter projectile loads are loose and are employed against more slightly built animals such as hogs. Against mature, heavier animals at the height of virility, the cartridges are provided not only with a "heavier" explosive charge, but also with a heavier load of projectile charge at a desired degree of compaction found effective for the purpose.

This invention is amenable to projection of a powdered missile cloud over a larger area than that within the confines of the small arms caliber of the cartridge and the gun.

Figure 3:
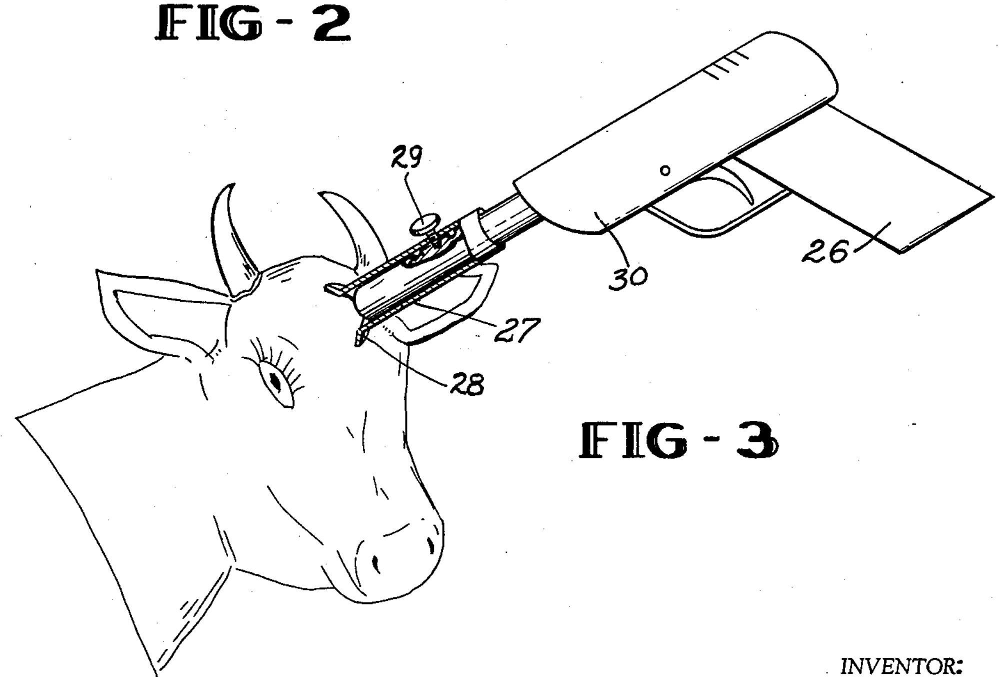
FIGURE 3 is an elevational view showing the manner of animal stunning contemplated according to this invention with the aid of a suitable tool of pistol-like character.

One suitable gun 30 as shown in FIGURE 3 has a cartridge magazine 26 and is preferably of a dispersal enhancing construction having some rifling 32 in a .22 caliber barrel bore, for example, to spread the powdered projectile over a wide pattern represented by a circle of diameter from about ½ of an inch to about 2 inches. A muzzle tube 27 with a dispersal enhancing conical mask or hood 28 adjustably mounted in barrel notches by set screw 29 also serves to provide a "stand-off distance" at the gun muzzle. This distance may be varied up to and within 12 inches, for example, as shown in the tool of FIGURE 3 for obtaining a fine degree of control with a given type and size of cartridge load to avoid undue bone fracture and damage to the meat.

Although iron powder free of binder is preferred as the projectile material, other materials in sufficiently finely divided powdered form and in suitable amount for the purpose are also contemplated to the extent these are not toxic either to the animal or to the operator of the animal stunning device employed according to this invention. Metallic, mineral, or synthetic powders may be used. Specifically, other suitable materials are sawdust, kaolin clay, limestone, gypsum, carbon, polyethylene, polystyrene, aluminum, nickel, and any suitable metal other than lead.

Figure 1:
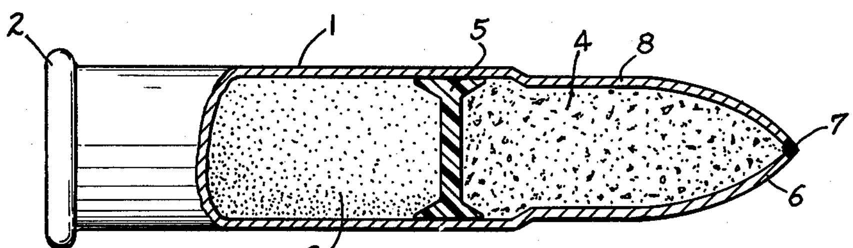
FIGURE 1 is a side view partly in cross section showing a cartridge according to one embodiment of this invention.

According to the preferred embodiment shown in FIGURE 1, a rimfire cartridge case 1, primed at the rim 2, is loaded with a suitable charge of smokeless powder 3 and also with a powdered projectile charge 4 separated from the explosive powder by a suitable wad 5. The front end of the case is crimped shut preferably by a circumferential array of pleats and folds as shown in 6; the tip is sealed against the entry of moisture by a plug 7 of any suitable sealant, such as collodion, wax, or a plastic polymer such as polyethylene.

The front end of the case is necked at 8 to fit in the breech of a pistol 30 to extend into the conventional projectile chamber 31 encountered in the bore of pistols of small arms caliber such as a .22 caliber pistol, having rifling 32.

Wad 5 may be of any suitable configuration such as that shown and of any suitable material, but preferably an olefinic polymer such as low density polyethylene of an elastomeric character. Wad 5 provides obturation as well as a separating partition between the charges.

According to one example of a "light load" cartridge, a .22 caliber long shot case 1 of brass and suitably primed, is first charged with about 1.3 grains of a double base smokeless powder designed to give a test barrel pressure of about 24,000 p.s.i. maximum average under load and measured with a crusher gauge under a 0.146 inch diameter piston disposed about 0.400 of an inch from the breech.

Over the propellant powder, the elastic wad 5 was inserted and then a 12 grain charge of iron powder was poured loose upon it, and the fully loaded case was star crimped shut to make an ogival point 6 on the reduced front section 8 of the case, sealed at 7.

Figure 2:
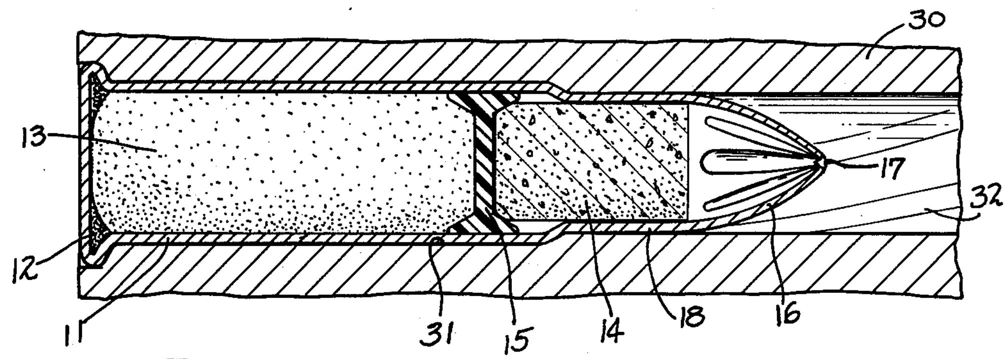
FIGURE 2 is a view in cross section showing another embodiment mounted at the breech of an animal stunning tool a portion of the barrel of which is also shown in cross section.

FIGURE 2 illustrates a typical "heavy load" of .22 caliber having the case 11, the primer assembly 12 and the explosive charge 13 consisting of about 1.3 grains of a faster burning powder than that of the cartridge of FIGURE 1. As before, this is covered with the elastic polyethylene wad 15 and the case is closed by the star crimp 16 and sealed by a globule of sealant 17.

The projectile charge is a compressed slug 14 made up of about 15 grains of iron powder mixed with a small amount of a solid suitable lubricant. This charge is compacted lightly in a tableting press to form a slug having a diameter of about 0.209 of an inch and a height of about 0.330 of an inch.

Using such .22 caliber cartridges in a pistol according to the method shown in FIGURE 3, various animals such as sheep, hogs, calves, and steers are readily stunned with safety and a minimum of damage.

Variation in stunning power needed is obtained by selection of a suitable cartridge from a variety available in a series provided for the purpose and/or by adjustment of the distance from the muzzle of the animal stunning gun. In any event, the particles projected must be large enough to be effective, but not so large as to cause substantial penetration like ordinary projectiles.

What is claimed is:

1. An abattoir cartridge for a small arms animal stunning gun comprising in combination a cartridge case, a priming assembly, a propellant charge of powder, an obturating over powder wad and a divided, non-toxic projectile charge of a weight ranging from about 10 grains to about 20 grains and comprised of a variety of particle sizes distributed in a range having particles not larger than about 0.05–0.060 of an inch of a material other than lead, said projectile charge being projectable from the case upon ignition of said propellant charge as a pulverulent missile capable of stunning an animal within a predetermined short range distance from the case and muzzle of said stunning gun.

2. An abattoir cartridge for a small arms animal stunning gun comprising in combination a metal cartridge case of .22 caliber having integrally with said case a front end closure, a rim fire priming assembly, a propellant charge of powder, and obturating overpowder wad of olefinic polymer and a divided non-toxic projectile charge of a weight ranging from about 10 grains to about 20 grains and of a variety of particle sizes distributed in a range having particles not larger than about 0.050–0.060 of an inch of a material other than lead, such as iron, adapting said material for projection from the case upon ignition of said propellant charge as a pulverulent missile capable of stunning said animal within a predetermined distance of not more than 12 inches from the muzzle of said stunning gun, said projectile charge including a small amount of solid lubricant, said material and lubricant being compacted to form between said closure and wad a slug frangible upon ignition and projection through said closure.

3. An abattoir cartridge for a small arms animal stunning gun comprising in combination a metal cartridge case of .22 caliber having integrally with said case a front end closure, a rim fire priming assembly, a propellant charge of powder, an obturating overpowder wad of olefinic polymer and a divided non-toxic projectile charge of a weight ranging from about 10 grains to about 20 grains and of a variety of particle sizes distributed in a range having particles not larger than about 0.050–0.060 of an inch of a material other than lead, such as iron, adapting said material for projection from the case upon ignition of said propellant charge as a pulverulent missile capable of stunning said animal within a predetermined distance of not more than 12 inches from the muzzle of said stunning gun, said projectile charge being loose between said closure and wad and substantially free from binder.

4. In the method of slaughtering animals in an abattoir, the steps comprising (1) providing an ammunition cartridge having a divided non-toxic projectile charge of material other than lead, such as iron powder, said charge having a weight ranging from about 10 grains to about 20 grains and a variety of particle sizes distributed in a range having particles not larger than about 0.050–0.060 of an inch, (2) explosively projecting at an effective short range a missile cloud of said particles from a gun device against a vulnerable part of the head of the animal sufficiently forcibly within said short range to stun said animal, and (3) selecting the stunning force at said part over a pattern by varying said pattern within a diameter from about half an inch to about two inches applied at a predetermined distance of not more than 12 inches from the muzzle of said gun device.

References Cited in the file of this patent

UNITED STATES PATENTS

| | | |
|---|---|---|
| 38,414 | Root | May 5, 1863 |
| 1,668,432 | Thorstenson | May 1, 1928 |
| 2,292,047 | Calhoun | Aug. 4, 1942 |
| 2,895,164 | Murphy | July 21, 1959 |
| 2,911,911 | White | Nov. 10, 1959 |
| 3,003,418 | Young | Oct. 10, 1961 |
| 3,031,716 | Hughes | May 1, 1962 |

FOREIGN PATENTS

| | | |
|---|---|---|
| 1,149 | Great Britain | of 1903 |
| 599,208 | Canada | May 31, 1960 |

OTHER REFERENCES

Shot-Guns (a book), by H. B. C. Pollard, 1923, Pitman and Sons, Ltd., publishers, pp. 61–65 required.